United States Patent
Yuan

(10) Patent No.: US 8,872,886 B2
(45) Date of Patent: Oct. 28, 2014

(54) METHOD, APPARATUS, AND SYSTEM FOR ESTABLISHING MULTI-CASCADE CHANNEL

(71) Applicant: Huawei Technologies Co., Ltd., Shenzhen (CN)

(72) Inventor: Shaochun Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/102,267

(22) Filed: Dec. 10, 2013

(65) Prior Publication Data

US 2014/0098181 A1    Apr. 10, 2014

Related U.S. Application Data

(63) Continuation of application No. PCT/CN2012/080370, filed on Aug. 20, 2012.

(30) Foreign Application Priority Data

Feb. 6, 2012  (CN) .......................... 2012 1 0025368

(51) Int. Cl.
| | |
|---|---|
| H04N 7/14 | (2006.01) |
| H04M 3/56 | (2006.01) |
| H04L 29/06 | (2006.01) |
| H04N 7/15 | (2006.01) |
| H04L 12/18 | (2006.01) |

(52) U.S. Cl.
CPC ............... *H04N 7/152* (2013.01); *H04M 3/567* (2013.01); *H04L 65/4038* (2013.01); *H04L 29/06* (2013.01); *H04L 12/1854* (2013.01); *H04L 12/18* (2013.01); *H04L 65/00* (2013.01)
USPC .................................... 348/14.09; 348/14.08

(58) Field of Classification Search
CPC .......... H04N 7/14; H04N 7/15; H04W 40/02; H04W 48/02; H04W 48/10; H04W 4/003; H04W 88/14; H04W 88/16
USPC ........................................... 348/14.08–14.09
See application file for complete search history.

(56) References Cited

U.S. PATENT DOCUMENTS

2009/0315975 A1    12/2009  Wiener et al.
2011/0085019 A1    4/2011   Li et al.
(Continued)

FOREIGN PATENT DOCUMENTS

| CN | 1516463 A | 7/2004 |
| CN | 101345844 A | 1/2009 |

(Continued)

OTHER PUBLICATIONS

Foreign Communication From A Counterpart Application, PCT Application No. PCT/CN2012/080370, English Translation of International Search Report dated Nov. 22, 2012, 3 pages.

(Continued)

*Primary Examiner* — Mohammad Islam
(74) *Attorney, Agent, or Firm* — Conley Rose, P.C.; Grant Rodolph

(57) ABSTRACT

A method, an apparatus and a system for establishing a multi-cascade channel. The method includes: receiving the site code stream obtaining request, where the request includes at least one identifier of the site; receiving an address and a port that correspond to the identifier of the site according to encoding information of a stream of the site code identified by the identifier of the site, and the address and the port that correspond to the identifier of the site; establishing a multi-cascade channel used for transmitting the code stream of the site identified by the identifier of the site; and sending the code stream of the site identified by the identifier of the site through the multi-cascade channel.

10 Claims, 4 Drawing Sheets

(56) References Cited

U.S. PATENT DOCUMENTS

| | | |
|---|---|---|
| 2011/0307585 A1 | 12/2011 | Wang et al. |
| 2011/0317585 A1 | 12/2011 | Wang et al. |
| 2012/0236106 A1 | 9/2012 | Wu |
| 2012/0263286 A1* | 10/2012 | Liao et al. ............... 379/202.01 |
| 2013/0100237 A1* | 4/2013 | Zeng .......................... 348/14.08 |
| 2013/0210401 A1* | 8/2013 | Knaz ............................. 455/416 |
| 2013/0335515 A1* | 12/2013 | Wamorkar et al. ........ 348/14.09 |

FOREIGN PATENT DOCUMENTS

| | | |
|---|---|---|
| CN | 101540872 A | 9/2009 |
| CN | 101588253 A | 11/2009 |
| CN | 102006451 A | 4/2011 |
| CN | 102082944 A | 6/2011 |
| CN | 102204244 A | 9/2011 |
| CN | 102611562 A | 7/2012 |
| WO | 2011063763 A1 | 6/2011 |

OTHER PUBLICATIONS

Partial English Translation and Abstract of Chinese Patent Application No. CN 1885785, Dec. 4, 2013, 4 pages.

Partial English Translation and Abstract of Chinese Patent Application No. CN 10110939, Dec. 4, 2013, 4 pages.

Partial English Translation and Abstract of Chinese Patent Application No. CN 101198008, Dec. 4, 2013, 4 pages.

Partial English Translation and Abstract of Chinese Patent Application No. CN 101262587, Dec. 4, 2013, 5 pages.

Partial English Translation and Abstract of Chinese Patent Application No. CN 101998105, Dec. 9, 2014, 8 pages.

Foreign Communication From a Counterpart Application, International Application No. PCT/CN2012/080370, English Translation of International Search Report dated Nov. 22, 2012, 3 pages.

English Translation of Chinese Patent Application Publication No. CN 102082944, Jun. 1, 2011, 34 pages.

* cited by examiner

US 8,872,886 B2

METHOD, APPARATUS, AND SYSTEM FOR ESTABLISHING MULTI-CASCADE CHANNEL

CROSS-REFERENCE TO RELATED APPLICATION

This application is a continuation of International Application No. PCT/CN2012/080370, filed on Aug. 20, 2012, which claims priority to Chinese Patent Application No. 201210025368.4, filed on Feb. 6, 2012, both of which are hereby incorporated by reference in their entireties.

TECHNICAL FIELD

The present invention relates to the field of communications technologies, and in particular, to a method, an apparatus and a system for establishing a multi-cascade channel.

BACKGROUND

A video and/or audio multipoint conference is a more and more important communication manner. In the current multipoint conference networking manner, Multipoint Control Unit (MCU) cascading is a quite convenient and practical networking mode. A cascaded conference refers to a conference networking mode of a large conference formed among multiple MCUs through calls, which is in a tree structure. An MCU at an upper layer is referred to as an upper level MCU, and an MCU at a lower layer is referred to as a lower level MCU. Upper levels and lower levels are relative.

When a cascaded conference is formed, a call may be initiated between upper and lower level MCUs, and a channel may be established to transmit a code stream of a site.

A call can at most only negotiate two channels used for transmitting a site image (video) (separately used for receiving an image code stream and sending an image code stream), and/or two channels used for transmitting site audio, and/or two channels used for transmitting site data (all these channels are referred to as cascade channels), so a lower level MCU can at most only send an image code stream of a site, and/or an audio code stream of a site, and/or a data code stream of a site to an upper level MCU at the same time. If the upper level MCU needs to obtain image code streams of multiple sites, and/or audio code streams of the multiple sites, and/or data code streams of the multiple sites of a lower level MCU at the same time, they can be obtained only in a polling manner.

It should be noted that, in a conventional cascaded conference, only the above fixed cascade channels may be negotiated, multi-cascade channels mentioned below are several similar channels established besides the cascade channel.

In the prior art, the manner for transmitting multiple site code streams between upper and lower level MCUs is as follows (taking an image code stream of a site as an example):

1) Before a cascaded conference is held, the number of multi-cascade channels between upper and lower level MCUs that will be used in the conference is determined, for example, 3.

2) In a process of holding the cascaded conference, an upper level MCU initiates a call with a lower level MCU additionally according to the number of multi-cascade channels specified before the conference, and the specified number of the multi-cascade channels is the number of calls that will be initiated.

3) In the conference, if the upper level MCU needs to watch images of multiple sites on the lower level MCU, the lower level MCU may use a channel established by the additional calls to send the images of the multiple sites. Likewise, a multi-cascade channel also can send an image code stream of a site only.

With the technology, multiple site images can be transmitted between upper and lower level MCUs, but the technology has the following technical drawbacks:

1. The number of multi-cascade channels must be specified before a conference. If in a conference, the number of sites on a lower level MCU that are expected to be watched by an upper level MCU exceeds the specified number of multi-cascade channels, not all sites expected to be watched can be watched.

2. The number of multi-cascade channels specified before a conference is the number of additional calls generated in a conference creation process. If the multi-cascade channels are not used in the conference, the calls still exist, occupy system resources of an MCU such as call resources, and cannot release the resources.

SUMMARY

Embodiments of the present invention provide a method, an apparatus and a system for establishing a multi-cascade channel, so that a multi-cascade channel used for transmitting a code stream of a specified site can be established between upper and lower level MCUs.

In one aspect, an embodiment of the present invention provides a method for establishing a multi-cascade channel, where the method includes: receiving a site code stream obtaining request, where the request includes at least one identifier of a site; receiving an address and a port that correspond to the identifier of a site; establishing, according to encoding information of a code stream of a site identified by the identifier of a site, and the address and the port that correspond to the identifier of a site, a multi-cascade channel used for transmitting the code stream of the site identified by the identifier of a site; and sending, through the multi-cascade channel, the code stream of the site identified by the identifier of a site.

In another aspect, an embodiment of the present invention provides an apparatus for establishing a multi-cascade channel, where the apparatus includes: a receiving module configured to receive a site code stream obtaining request, where the request includes at least one identifier of a site, and further configured to receive an address and a port that correspond to the identifier of a site; an establishing module configured to establish, according to encoding information of a code stream of a site identified by the identifier of a site, and the address and the port that correspond to the identifier of a site, a multi-cascade channel used for transmitting the code stream of the site identified by the identifier of a site; and a code stream sending module configured to send, through the multi-cascade channel, the code stream of the site identified by the identifier of a site.

In still another aspect, an embodiment of the present invention provides a system for establishing a multi-cascade channel, where the system includes a first MCU and a second MCU, where the first MCU is configured to send a site code stream obtaining request to the second MCU, the request includes at least one identifier of a site, send an address and a port that correspond to the identifier of a site to the second MCU, establish, according to encoding information of a code stream of a site identified by the identifier of a site, and the address and the port that correspond to the identifier of a site, a multi-cascade channel used for transmitting the code stream of the site identified by the identifier of a site with the second MCU, receive, through the multi-cascade channel, the code stream of the site identified by the identifier of a site; and the second MCU is configured to receive the site code stream obtaining request from the first MCU, receive the address and the port that correspond to the identifier of a site from the first MCU, establish, according to the encoding information of the code stream of the site identified by the identifier of a site, and the address and the port that correspond to the identifier of a site, a multi-cascade channel used for transmitting the code stream of the site identified by the identifier of a site, and send, through the multi-cascade channel, the code stream of the site identified by the identifier of a site.

In the embodiments of the present invention, a multi-cascade channel used for transmitting a code stream of a specified site is established, and the code stream of the specified site is transmitted, which solves the problem in the prior art that not all site code streams expected to be obtained can be obtained when the number of multi-cascade channels required for code streams expected to be obtained exceeds the specified number of multi-cascade channels that must be specified before a conference, thereby achieving the purposes of dynamically establishing a multi-cascade channel as required and obtaining all site code streams expected to be obtained.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

In order to achieve the objectives of the present invention, the embodiments of the present invention provide a solution of dynamically establishing a multi-cascade channel used for transmitting a code stream of a specified site as required and transmitting the code stream of the specified site. The following describes the embodiments of the present invention in detail with reference to the accompanying drawings.

Figure 1:
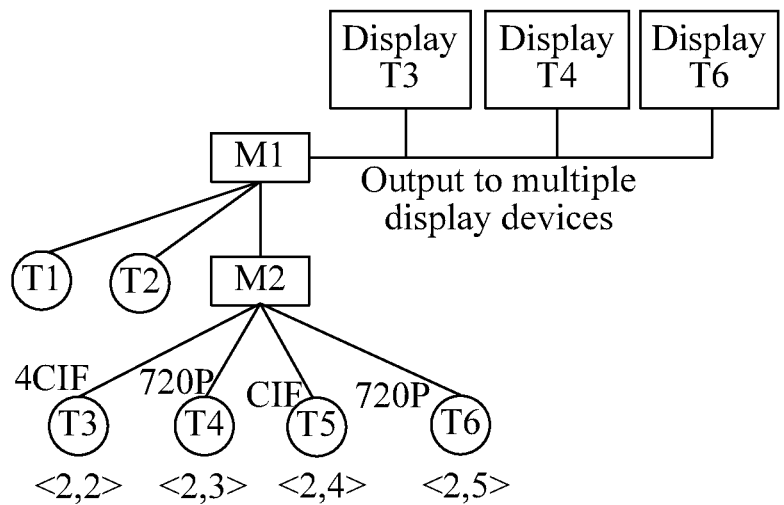
FIG. 1 is a schematic diagram of networking of a cascaded conference.

FIG. 1 is a schematic diagram of networking of a cascaded conference. As shown in FIG. 1, M1 is an upper level MCU of M2, and M2 is a lower level MCU of M1. M1 has two sites T1 and T2, and M2 has four sites T3, T4, T5 and T6.

An upper level MCU may request to obtain code streams of one or multiple sites of a lower level MCU. If the code streams are image code streams, images of the multiple sites are output to different display devices, such as a device shown in FIG. 1 for displaying images of sites T3, T4 and T6. Likewise, the lower level MCU may also request to obtain code streams of multiple sites of the upper level MCU.

It should be noted that, there are two types of MCUs:

One type is a professional-grade MCU. There is no site for the type of MCU, and it may transmit a code stream of a site belonging to the type of MCU through an inherent cascade channel established with other MCUs. If code streams of more than one site belonging to the type of MCU need to be transmitted at the same time, a multi-cascade channel needs to be established for transmission.

One type is a terminal with a built-in MCU function. There are sites for the type of MCU, and it may transmit a code stream of a site of the type of MCU through an inherent cascade channel established with other MCUs. If code streams of one or some sites belonging to the type of MCU are to be transmitted, a multi-cascade channel needs to be established for transmission.

Figure 2A:
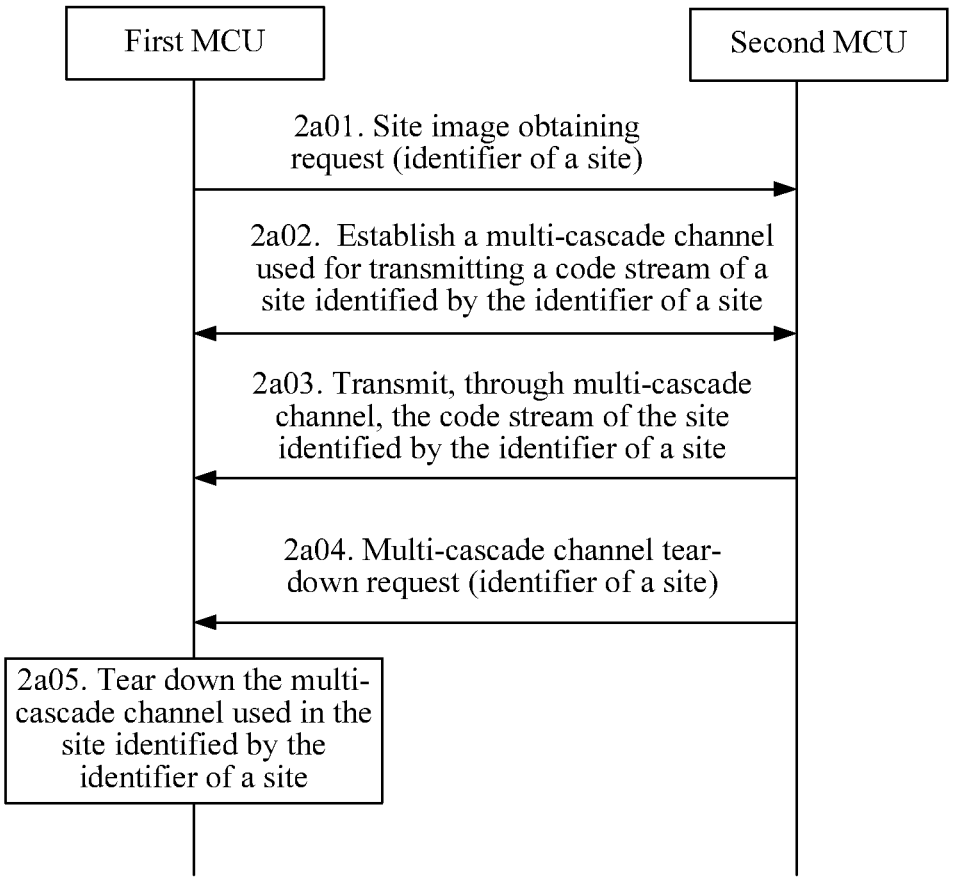
FIG. 2A is a schematic flowchart of a method for establishing a multi-cascade channel according to Embodiment 1 of the present invention.

FIG. 2A is a schematic flowchart of a method for establishing a multi-cascade channel according to Embodiment 1 of the present invention. As shown in FIG. 2A, this embodiment includes the following steps:

Step 2a01: A first MCU sends a site code stream obtaining request to a second MCU, where the request includes at least one identifier of a site.

The first MCU may be referred to as a requester.

The site code stream obtaining request is used for requesting to obtain a code stream of a site identified by the identifier of a site, and may be specifically used for requesting an image code stream, and/or an audio code stream, and/or a data code stream, and/or other code streams of the site identified by the identifier of a site. In Embodiment 1 of the present invention to Embodiment 6 of the present invention, requesting for only a certain type of code stream (such as an image code stream, or an audio code stream, or a data code stream) of a site is taken as an example for detailed illustration.

The identifier of a site is used for identifying the site, and the format may be <M T> (<MCU Terminal>). It should be noted that the identifier of a site is allocated by a first MCU for the site when the site is established.

Preferably, the first MCU is an upper level MCU, and the second MCU is a lower level MCU.

The first MCU needs to further send an address and a port that correspond to the identifier of a site to the second MCU. That is, the first MCU is configured to receive an address and a port of a code stream of a site identified by the identifier of a site, and configured to instruct the second MCU to send a code stream to the address and the port.

Preferably, the site code stream obtaining request carries the address and the port that correspond to the identifier of a site, and at the same time, the first MCU starts interception on each port. The examples are as follows:

REQ
<M2 T1> <LOCAL IP1> <PORT1>
<M2 T2> <LOCAL IP2> <PORT2>
. . .
<M2 Tn> <LOCAL IPn> <PORTn>

The Request (REQ) denotes a site code stream obtaining request; the <M2 T1>, <M2 T2> and <M2 Tn> denote an identifier of a site; the <LOCAL IP1> <PORT1>, <LOCAL IP2> <PORT2> and <LOCAL IPn> <PORTn> denote addresses and ports.

Further examples are as follows:
REQ
<2,2> ADDRM1 5001
<2,3> ADDRM1 5002

The foregoing examples indicate that requesting for the address of a code stream of a site whose identifier is <2,2> and receiving the code stream of the site whose identifier is <2,2> with the address ADDRM1, and the port 5001.

The site code stream obtaining request may be a site image code stream obtaining request or a site audio code stream obtaining request or a site data code stream obtaining request by default, for example, the REQ denotes the site image code stream obtaining request. The types of obtained code streams may also be distinguished through different request names, for example, videoREQ denotes a site image code stream obtaining request, audioREQ denotes a site video code stream obtaining request, and dataREQ denotes a site data code stream obtaining request. The types of obtained code streams may also be distinguished through other identifiers, for example, REQ video <M2 T1> <M2 T2> denotes requesting for an image code stream of sites <M2 T1> and <M2 T2>, REQ <M2 T1> video <M2 T2> video&audio denotes requesting for an image code stream of site <M2 T1>, and an image code stream and an audio code stream of site <M2 T2> (in this manner, different types of code streams of different sites may be obtained through a request).

Specifically, if the cascaded conference implements capability and media control through the H.245 protocol, the site code stream obtaining request may be carried through signaling of an extended H.245 protocol.

The signaling of the H.245 protocol includes the request signaling RequestMessage, the response signaling ResponseMessage, and the command signaling CommandMessage. The signaling includes a nonstandard conference control field (NonStandard), and the nonstandard conference control field includes a data field.

Preferably, the site code stream obtaining request may be carried through the nonstandard conference control field of the request signaling, and may specifically be stored in the data field in a form of a string.

In Embodiment 1 of the present invention to Embodiment 6 of the present invention, information transmitted between the first MCU and the second MCU is carried through the signaling of the extended H.245 protocol, where the signaling that may be used mainly includes the request signaling RequestMessage, response signaling ResponseMessage, and command signaling CommandMessage. Preferably, the information is carried through the nonstandard conference control field of corresponding signaling, and preferably, the information is stored in the data field of the nonstandard conference control field in a form of string.

Optionally, the address and the port may also not be carried through the site code stream obtaining request, for example, may be sent by the first MCU to the second MCU in the process of establishing a multi-cascade channel in step 2a02.

Step 2a02: Establish, between the first MCU and the second MCU, a multi-cascade channel used for transmitting the code stream of the site identified by the identifier of a site.

Specifically, the second MCU establishes the multi-cascade channel according to encoding information of the code stream of the site identified by the identifier of a site, and the address and the port that correspond to the identifier of a site of the first MCU, where the process of establishing a connection of the multi-cascade channel may comply with a process of establishing a Transport control Protocol (TCP) connection by using a socket.

Preferably, the method further includes the following: the second MCU sends, to the first MCU, the encoding information of the code stream of the site identified by the identifier of a site, where the encoding information is used by the first MCU to build a decoder used for decoding the code stream of the site identified by the identifier of a site.

Preferably, the encoding information specifically includes a protocol, a format and a bandwidth.

Preferably, the method further includes the following: the second MCU sends a success response to the first MCU, and carries the encoding information in the success response. The examples are as follows:
SUCC RSP
<M2 T1> <PRTL1> <FORMAT1> <BANDWIDTH1>
<M2 T2> <PRTL2> <FORMAT2> <BANDWIDTH2>
. . .
<M2 Tn> <PRTLn> <FORMATn> <BANDWIDTHn>

The Success Response (SUCC RSP) denotes a successful response; and the <M2 Tn> <PRTLn> <FORMATn> <BANDWIDTHn> denotes that encoding information of a code stream of a site whose identifier is <M2 Tn> is: the protocol being <PRTLn>, the format being <FORMATn>, and the bandwidth being <BANDWIDTHn>.

Further examples are as follows:
SUCC RSP
<2,2> H264 4CIF 1024
<2,3> H264 CIF 512

The foregoing examples indicate that the encoding information of the site code stream of site <2,2> is: the protocol being H264, the format being Quarter Common Intermediate Format (4CIF), and the bandwidth being 1024; and the encoding information of the site code stream of site <2,3> is: the protocol being H264, the format being Common Intermediate Format (CIF), and the bandwidth being 512.

The first MCU builds, by using the encoding information, a decoder used for decoding the code stream of the site identified by the identifier of a site.

Preferably, the success response message is carried through the nonstandard conference control field of the response signaling ResponseMessage of the H.245 protocol.

Step 2a03: The second MCU sends the code stream of the site identified by the identifier of a site to the first MCU through the multi-cascade channel.

Specifically, the second MCU sends the code stream to the address and the port through the multi-cascade channel.

The first MCU may use the decoder to decode the code stream after receiving the code stream. Preferably, the first MCU outputs the decoded code stream to a corresponding device (for example, outputting an image code stream to a corresponding display device).

If the following situation exists: the site code stream obtaining request may include an identifier of a site used for identifying a site not belonging to the second MCU, preferably, the method further includes:

The second MCU determines whether the sites identified by the identifiers of sites all belong to the site of the second MCU.

If not, the second MCU executes the following steps: determining a MCU (referred to as a third MCU subsequently) to which a site not belonging to the second MCU belongs; sending a site code stream obtaining request to the third MCU, where the request includes an identifier of a site of the site not belonging to the second MCU; and preferably, establishing a multi-cascade channel used for transmitting a code stream of the site not belonging to the second MCU with the third MCU, receiving the code stream through the multi-cascade channel, and forwarding the code stream to the first MCU. If this manner is adopted, it is required to establish a multi-cascade channel used for transmitting the code stream of the site not belonging to the second MCU with the first MCU, where the multi-cascade channel is used for forwarding the code stream.

Optionally, a multi-cascade channel used for transmitting the code stream of the site not belonging to the second MCU may further be established directly between the first MCU and the third MCU, and the code stream is transmitted through the multi-cascade channel. If this manner is adopted, it is not required to establish, between the first MCU and the second MCU, a multi-cascade channel used for transmitting the code stream of the site not belonging to the second MCU.

Optionally, the embodiment of the present invention further provides a method for tearing down a multi-cascade channel.

Step 2a04: The second MCU sends a multi-cascade channel tear-down request to the first MCU, where the multi-cascade channel tear-down request includes the at least one identifier of a site.

Preferably, the multi-cascade channel tear-down request is carried through the nonstandard conference control field of the request signaling RequestMessage of the H.245 protocol.

Step 2a05: The first MCU tears down the multi-cascade channel used in the site identified by the identifier of a site.

After the multi-cascade channel is torn down, the occupied system resources are released.

Preferably, the method further includes the following: the first MCU returns a tear-down request permission response to the second MCU.

The tear-down request permission response may be carried through the nonstandard conference control field of the response signaling ResponseMessage of the H.245 protocol.

Preferably, if the first MCU is allowed to tear down the multi-cascade channel of the site identified by a part of identifiers of sites in the identifiers of sites, only the multi-cascade channel of the site identified by the part of identifiers of sites are torn down.

Preferably, the part of identifiers of sites may be carried in the tear-down request permission response.

If the first MCU is not allowed to tear down the multi-cascade channel, a tear-down request rejection response may be returned.

The tear-down request rejection response may be carried through the nonstandard conference control field of the response signaling ResponseMessage of the H.245 protocol.

Optionally, the first MCU may further actively tear down the multi-cascade channel. Preferably, the method further includes the following: the first MCU sends a multi-cascade channel tear-down command to the second MCU, where the multi-cascade channel tear-down command includes the at least one identifier of a site.

The multi-cascade channel tear-down command may be carried through the nonstandard conference control field of the command signaling CommandMessage of the H.245 protocol.

In the embodiment of the present invention, a multi-cascade channel of a specified site is established, and a specified site code stream is transmitted, which solves the problem in the prior art that not all site code streams expected to be obtained can be obtained when the number of multi-cascade channels required for code streams expected to be obtained exceeds the specified number of multi-cascade channels that must be specified before a conference. In addition, the embodiment of the present invention further provides a method for tearing down a specified multi-cascade channel, which solves the problem in the prior art that multi-cascade channels that are not used occupy system resources of an MCU, such as call resources, and cannot release the resources.

Figure 2B:
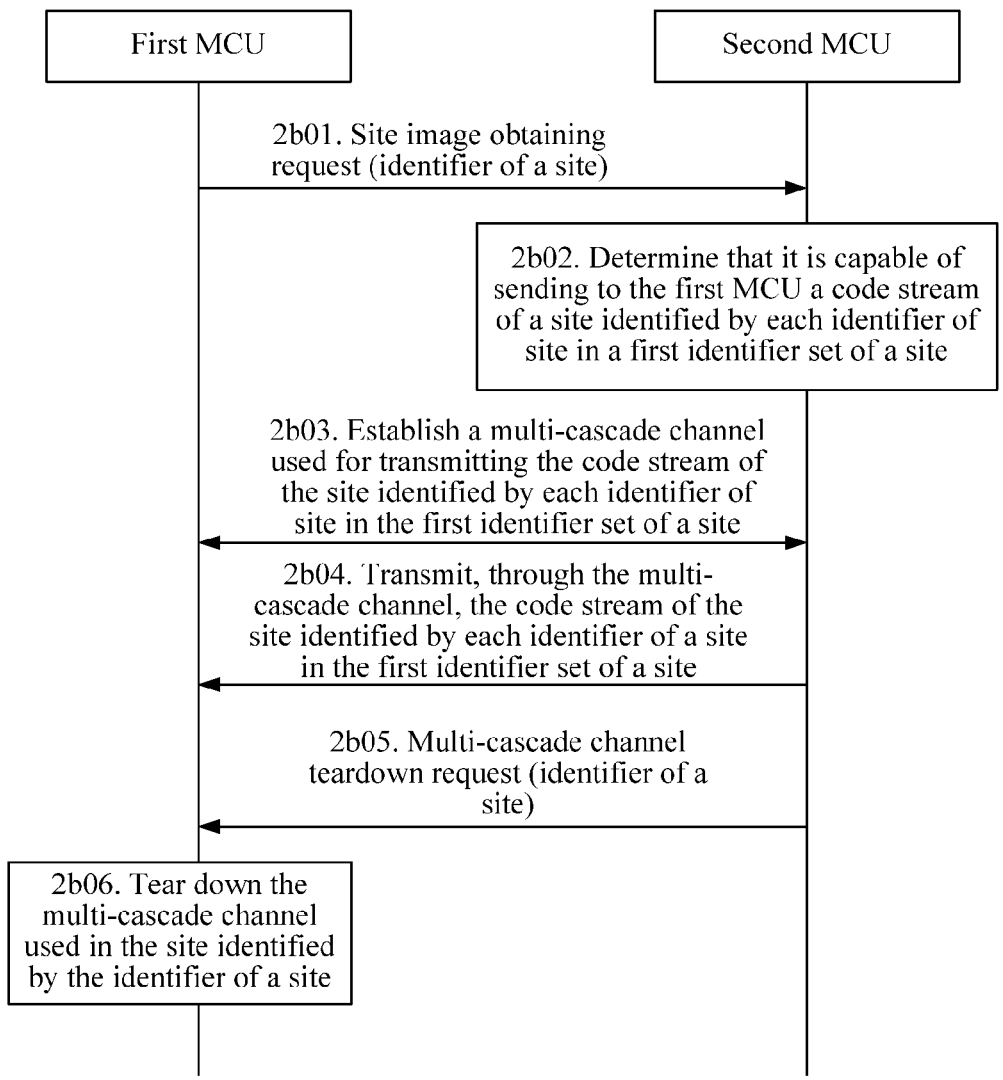
FIG. 2B is a schematic flowchart of a method for establishing a multi-cascade channel according to Embodiment 2 of the present invention.

FIG. 2B is a schematic flowchart of a method for establishing a multi-cascade channel according to Embodiment 2 of the present invention.

As shown in FIG. 2B, this embodiment includes the following steps:

Step 2b01 is the same as step 2a01.

Step 2b02: The second MCU determines that it is capable of sending, to the first MCU, a code stream of a site identified by each identifier of a site in a first identifier set of a site.

It should be noted that, the identifier of a site in the site code stream obtaining request in step 2b01 may be considered as a set, and for convenience of description, is collectively referred to as a request identifier set of a site subsequently.

The definition of a subset: for two nonempty sets A and B, if any element of set A is an element of set B, set A is a subset of set B. All sets are subsets of themselves.

The first identifier set of a site is a subset of the request identifier set of a site.

Preferably, if the second MCU determines that it is capable of sending, to the first MCU, code streams of sites identified by all identifiers of sites, in the site code stream obtaining request, the first identifier set of a site is the request identifier set of a site, which includes all identifiers of sites, in the site code stream obtaining request.

Preferably, the second MCU determines, according to decoding capability information of the first MCU and the encoding information of the site identified by each identifier of a site in the request identifier set of a site, that it is capable of sending, to the first MCU, the code stream of the site identified by each identifier of a site in first identifier set of a site.

The determining steps are mainly used for determining that the decoding capability of the first MCU can support decoding the code stream of the site identified by each identifier of a site in the first identifier set of a site simultaneously. If the decoding capability of the first MCU cannot support decoding of the received site code stream, a decoding exception may occur.

Preferably, the decoding capability information specifically includes a decoding protocol, a format and a maximum decoding bandwidth that are supported by the first MCU.

Preferably, before step 2b02, the method further includes: sending, by the first MCU, the decoding capability information to the second MCU, and the examples are as follows:

DEC
<PRTL1> <FORMAT1> <COUNT1>
<PRTL2> <FORMAT2> <COUNT2>
. . .
<PRTLn> <FORMATn> <COUNTn>
BANDWIDTH

The Decode (DEC) denotes that a decoding capability information sending message.

The <PRTL1>, <PRTL2> and <PRTLn> denote supported decoding protocols, such as the H.264; the <FORMAT1>, <FORMAT2> and <FORMAT2> denote supported formats, such as 720P30 (720 Progressive, horizontal 720 lines, interlaced scan and 30 frame per second), 4CIF and CIF; the <COUNT1>, <COUNT2> and <COUNTn> denote that the number of code streams corresponding to the protocol and format and are supported to be decoded; and the BANDWIDTH denotes the supported maximum decoding bandwidth.

The foregoing examples indicate that decoding <COUNT1> code streams whose protocols are <PRTL1> and whose formats are <FORMAT1> is supported, or decoding <COUNT2> code streams whose protocols are <PRTL2> and whose formats are <FORMAT2> is supported, decoding <COUNTn> code streams whose protocols are <PRTLn> and whose formats are <FORMATn> is supported, and the supported maximum decoding bandwidth is the BANDWIDTH.

Further examples are as follows:
DEC
H264 720P30 4
H264 4CIF 8
BANDWIDTH 12*1024

The foregoing examples indicate that the first MCU supports decoding four code streams whose protocols are H.264 and whose formats are 720P30, or supports decoding eight code streams whose protocols are H264 and whose formats are 4CIF, and the supported maximum decoding bandwidth is 12*1024.

Preferably, the decoding capability information sending message is carried through the nonstandard conference control field of the request signaling RequestMessage of the H.245 protocol.

To clearly illustrate specific implementation of steps in this embodiment, the examples are as follows (taking an image code stream of a site as an example):

As shown in FIG. 1, the upper level MCU requests the lower level MCU to establish a multi-cascade channel used for transmitting code streams of site T3 (an identifier of a site is <2,2>), T4 (an identifier of a site is <2,4>) and T6 (an identifier of a site is <2,5>), that is, a request identifier set of a site includes <2,2>, <2,4> and <2,5>.

The decoding capability of the upper level MCU is:
H264 720P30 4
H264 4CIF 8
H264 CIF 12
BANDWIDTH 12*1024
Coding information of sites T3, T4 and T6 is:
<2,2> H264 4CIF 1024
2,4> H264 CIF 512
<2,5> H264 720P30 2*1024

After receiving a request from the upper level MCU, the lower level MCU checks the encoding information of sites T3, T5 and T6 denoted by <2,2> <2,4> and <2,5>, where code streams of T3, T5 and T6 are 1 M 4CIF code stream, 512 K CIF code stream and 2 M 720P30 code stream, respectively; then checks decoding information sent by the upper level MCU previously, and finds that the maximum decoding bandwidth supported by the upper level MCU is 12*1024, which is greater than the total bandwidth of code stream sites of T3, T4 and T6; and finds that the upper level MCU can decode a maximum of four 720P30 code streams. Resources required for decoding one 720P30 code stream are more than those required for decoding one 4CIF code stream or one CIF code stream, so the upper level MCU definitely has no problem decoding one 4CIF code stream, one CIF code stream and one 720P30 code stream.

Therefore, the lower level MCU may determine that it is capable of sending code streams of sites (T3, T5 and T6) identified by <2,2>, <2,4> and <2,5> (a first identifier set of a site) to the upper level MCU.

Preferably, on the basis of determining the first identifier set of a site according to decoding capability information of the first MCU, and the encoding information of the site identified by each identifier of a site in the request identifier set of a site, the first identifier set of a site may also be determined in combination with a policy.

Preferably, the policy may specifically be: determining the first identifier set of a site according to priority information of a site (for example, preferentially including an identifier of a site of a site with a high priority), and/or including identifiers of sites, as many as possible.

Optionally, the policy may also be randomly selecting an identifier of a site belonging to the first identifier set of a site.

For example, the request identifier set of a site includes site 1, site 2, site 3 and site 4, the lower level MCU performs determination according to the decoding capability of the upper level MCU and the encoding information of the four sites and determines that not all site code streams can be sent. It is found that code streams of at most three sites can be sent, that is, site 1, site 2, and site 3, or site 1, site 2, and site 4, where the priority of site 3 is higher than the priority of site 4. If the first identifier set of a site is determined according to the priority information of the four sites, it may be determined that the identifiers of sites, included in the first identifier set of a site is site 1, site 2, site 3; and if the first identifier set of a site is determined according to a randomly selected policy, any one of the two groups may be selected as the first identifier set of a site. In addition, according to the policy of including identifiers of sites, as many as possible, because the code stream of at most three sites can be sent, any situations in which less than three site code streams can be sent may not be considered.

Preferably, before step 2b02, the method further includes: sending, by the first MCU, priority information of a site to the second MCU. The priority information may be denoted through a specific number, for example, the smaller the number is, the higher the priority is.

Preferably, the priority information is carried through the site code stream obtaining request, and the examples are as follows:
REQ
<M2 T1> <LOCAL IP1> <PORT1> <PRIORITY1>
<M2 T2> <LOCAL IP2> <PORT2> <PRIORITY2>
...
<M2 Tn> <LOCAL IPn> <PORTn> <PRIORITYn>
The <PRIORITY1>, <PRIORITY2> and <PRIORITYn> respectively denote priorities of their corresponding sites <M2 T1>, <M2 T2> and <M2 Tn>, which may be denoted through specific numbers, for example, the smaller the numbers are, the higher the priorities are.

Further examples are as follows:
REQ
<2,2> ADDRM1 5001 1
<2,3> ADDRM1 5002 3
<2,5> ADDRM1 5002 2

The forgoing examples indicate that the priority of site <2,2> is the highest, site <2,5> comes second, and the priority of site <2,3> is the lowest.

If the second MCU determines that it is incapable of sending a requested site code stream to the first MCU, return a failure response.

Preferably, the determining that it is incapable of sending a requested site code stream to the first MCU specifically is: if not all requested site code stream can be sent, it may be determined that it is incapable of sending the requested site code stream to the first MCU.

Optionally, determining that it is impossible to send a requested code stream site to the first MCU specifically is as follows: if only a part of requested site code streams can be sent, it may also be determined that it is impossible to send the requested site code stream to the first MCU, that is, no code streams of sites identified by any identifier of a site in the request identifier set of a site are sent. The manner is mainly used in the following occasions: either obtaining all requested site code stream, or obtaining no requested site code stream.

Preferably, the failure response includes failure cause information, and an example is as follows:

FAIL RSP <REASON>

The FAIL Response (FAIL RSP) denotes the failure response; and the <REASON> parameter denotes the failure cause.

Preferably, the failure response message is carried through the nonstandard conference control field of the response signaling ResponseMessage of the H.245 protocol.

Optionally, it may further be: if the second MCU determines that it is impossible to send all requested site code streams (that is, the first MCU cannot decode all requested site code streams at the same time) to the first MCU, the second MCU may send an identifier set of a site, which can be sent, to the first MCU for confirmation (the first MCU subsequently may request for a code streams of a site identified by each identifier of a site in the identifier set of a site); if there are more than one identifier set of a site, the second MCU may send one or more site sets to the first MCU for selection (the first MCU subsequently may request for a code stream of a site identified by each identifier of a site in the selected identifier set of a site).

Optionally, it may further be: the first MCU first obtains encoding information of a site from the second MCU, determines, according to the encoding information of the site and its own decoding capability information, sites the code streams of which may be requested, or determines whether code streams of one or some sites may be requested, and after the determining, requests the second MCU for the code streams of the determined site, where the request carries the identifiers of the determined sites.

Step 2b03: Establish, between the first MCU and the second MCU, a multi-cascade channel used for transmitting the code stream of the site identified by each identifier of a site in the first identifier set of a site.

Specifically, the second MCU establishes, according to the encoding information of the code stream of the site identified by each identifier of a site in the first identifier set of a site, and the address and the port that correspond to the first identifier set of a site of the first MCU, a multi-cascade channel used for transmitting the code stream of the site identified by each identifier of a site in the first identifier set of a site.

Step 2b04: The second MCU sends, through the multi-cascade channel, the code stream of the site identified by each identifier of a site in the first identifier set of a site to the first MCU.

Step 2b05 is the same as step 2a04.

Step 2b06 is the same as step 2a05.

In this embodiment, after obtaining a site code stream obtaining request sent by a first MCU, a second MCU determines that it is capable of sending, to a first MCU, a code stream of a site identified by each identifier of a site in a first identifier set of a site, after the determining, establishes a multi-cascade channel used for transmitting the code stream of the site identified by each identifier of a site in the first identifier set of a site with the first MCU, and sends, through the multi-cascade channel, the code stream of the site identified by each identifier of a site in the first identifier set of a site. Through the determining steps, it can be ensured as far as possible that subsequently the first MCU can successfully obtain and decode the site code stream sent by the second MCU, thereby avoiding decoding exception.

Figure 2C:
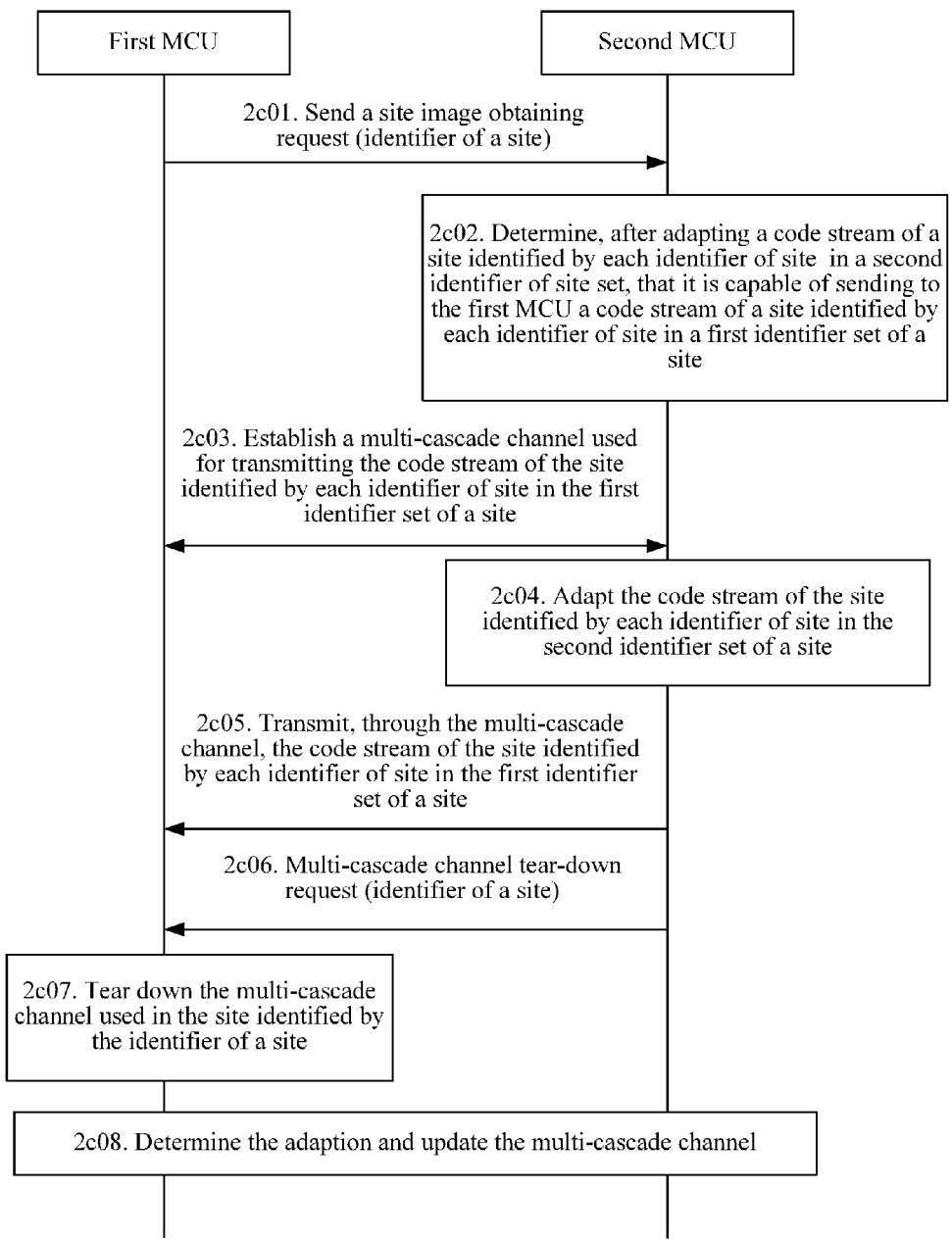
FIG. 2C is a schematic flowchart of a method for establishing a multi-cascade channel according to Embodiment 3 of the present invention.

FIG. 2C is a schematic flowchart of a method for establishing a multi-cascade channel according to Embodiment 3 of the present invention. As shown in FIG. 2C, this embodiment includes the following steps:

Step 2c01 is the same as step 2b01 (2a01).

Step 2c02: The second MCU determines, after adapting a code stream of a site identified by each identifier of a site in a second identifier set of a site, that it is capable of sending, to the first MCU, a code stream of a site identified by each identifier of a site in a first identifier set of a site.

The first identifier set of a site is a subset of identifiers of sites, in the site code stream obtaining request.

The second identifier set of a site is a subset of the first identifier set of a site.

Preferably, the second MCU determines, according to decoding capability information of the first MCU, the second identifier set of a site and a format of an adaptive code stream of the site identified by each identifier of a site in the second identifier set of a site.

The adaptive code stream refers to a code stream obtained after adapting the site code stream.

The example is as follows (taking an image code stream of a site as an example):

As shown in FIG. 1, the upper level MCU requests the lower level MCU to establish a multi-cascade channel used for transmitting code streams of site T3 (an identifier of a site is <2,2>), T4 (an identifier of a site is <2,4>) and T6 (an identifier of a site is <2,5>).

The decoding capability of the upper level MCU is:

H264 720P30 1

H264 4CIF 3

H264 CIF 6

BANDWIDTH 6*1024

Coding information of sites T3, T4 and T6 is:

<2,2> H264 4CIF 1024

<2,4> H264 CIF 512

<2,5> H264 720P30 2*1024

After receiving a request from the upper level MCU, the lower level MCU checks encoding information of sites T3, T5 and T6 denoted by <2,2>, <2,4> and <2,5>, where code streams sent by T3, T5 and T6 to the lower level MCU are 1 M 4CIF code streams, 512 K CIF code streams and 2 M 720P30 code streams, respectively; and then checks decoding information sent by the upper level MCU previously. The upper level MCU can only decode a maximum of one 720P30 code stream, so it is determined that the upper level MCU cannot decode one 4CIF code stream, one CIF code stream and one 720P30 code stream at the same time. Again it is determined that the upper level MCU can decode a maximum of three 4CIF code streams, and resources required for decoding one 4CIF code stream are more than those required for decoding one CIF code stream, so if 720P30 code streams of site T6 are adapted as 4CIF code streams, the upper level MCU may decode the three site code streams at the same time (the adapted code streams are equivalent to two 4CIF code streams and one CIF code stream).

Therefore, the lower level MCU can determine, after adapting a code stream of a site (T6) identified by <2,2> (a second identifier set of a site) (adapting a 720P30 code stream as a 4CIF code stream), that it is capable of establishing a multi-cascade channel used for transmitting code streams of sites (T3, T5 and T6) identified by <2,2>, <2,4> and <2,5> (a first identifier set of a site) with the upper level MCU.

Preferably, a second identifier set of a site is sent to a requester so that the requester may determine which site code streams are adapted.

The second identifier set of a site may be carried through a success response.

Preferably, the second identifier set of a site and the format of the adaptive code stream of the second identifier set of a site may further be determined according to the decoding capability information and a policy of the first MCU.

Preferably, the policy may specifically be: making the first identifier set of a site as large as possible, and/or preferentially adapting a code stream of a site with a low priority, and/or making the second identifier set of a site as small as possible, and/or making the adaptive code stream as clear as possible.

For example, the request identifier set of a site includes site 1, site 2, site 3 and site 4, where the priority of site 3 is higher than the priority of site 4. By performing determination according to the decoding capability of the upper level MCU and the encoding information of the four sites, it is found that not all site code streams can be sent.

If the code streams of site 3 or site 4 are adapted, all site code streams may be sent, and if the code streams are adapted according to the policy of preferentially adapting a code stream of a site with a low priority, it may be determined that the element of the second identifier set of a site is site 4.

If the code streams of site 3 and site 4 each are adapted from 720P30 to 4CIF, or only the code streams of site 3 or site 4 are adapted from 720P30 to CIF, all site code streams may be sent, if the code streams are adapted according to the policy of making the second identifier set of a site as small as possible and the policy of preferentially adapting a code stream of a site with a low priority, it may be determined that the element of the second identifier set of a site is site 4, and the format of the adaptive code stream is CIF; and if the code streams are adapted according to the policy of making the adaptive code stream as clear as possible, it may be determined that the element of the second identifier set of a site is site 3 and site 4, and the format of the adaptive code stream is 4CIF.

Step 2c03: Establish a multi-cascade channel used for transmitting the code stream of the site identified by each identifier of a site in the first identifier set of a site with the requester.

Specifically, if the second identifier set of a site is not empty, the establishing a multi-cascade channel used for transmitting a code stream of a site identified by each identifier of a site in the first identifier set of a site with the requester specifically includes: establishing a multi-cascade channel used for transmitting an adaptive code stream of a site identified by each identifier of a site in the second identifier set of a site according to encoding information of the code stream of the site identified by each identifier of a site in the second identifier set of a site, and the address and the port that correspond to the second identifier set of a site of the first MCU.

Step 2c04: Adapt the code stream of the site corresponding to each identifier of a site in the second identifier set of a site.

If the second identifier set of a site is not empty, execute this step.

Corresponding to step 2c02, for example, in step 2c02, it is determined, after adapting a code stream of a site (T6) identified by <2,2> (a second identifier set of a site) (adapting a 720P30 code stream as a 4CIF code stream), that it is capable of establishing a multi-cascade channel used for transmitting code streams of sites (T3, T5 and T6) identified by <2,2>, <2,4> and <2,5> (a first identifier set of a site) with the upper level MCU (the requester), so in this step, the code stream of site T6 is adapted from 720P30 to 4CIF.

Preferably, the adapting specifically is: after decoding a code stream, performing coding according to a format to be adapted, for example, first decoding the 720P30 code stream, and then performing coding according to the 4CIF format.

Step 2c05: Send, through the multi-cascade channel, the code stream of the site identified by each identifier of a site in the first identifier set of a site.

Specifically, if the second identifier set of a site is not empty, the sending, through the multi-cascade channel, the code stream of the site identified by each identifier of a site in the first identifier set of a site specifically includes: sending an adaptive code stream of the site identified by each identifier of a site in the second identifier set of a site through the multi-cascade channel used for transmitting the adaptive code stream of the site identified by each identifier of a site in the second identifier set of a site.

Step 2c06 is the same as step 2b05 (2a04).

Step 2c07 is the same as step 2b06 (2a05).

Step 2c08: Determine the adaption and update the multi-cascade channel.

This step is optional. After receiving the multi-cascade channel tear-down permission response or multi-cascade channel tear-down command, the second MCU determines whether site code streams transmitted by multi-cascade channels that are not torn down include adapted code streams, if including, determines a new second identifier set of a site, if an identifier of a site of a site corresponding to the adapted code stream does not belong to the new second identifier set of a site, that is, the code stream of the site identified by the identifier of a site no longer needs to be adapted, the second MCU updates the multi-cascade channel used for transmitting the site code stream so as to transmit an original code stream of the site, which specifically is: establishing a multi-cascade channel used for transmitting the original code stream of the site and tearing down a multi-cascade channel used for transmitting an adaptive code stream of the site, or updating the multi-cascade channel used for transmitting the adaptive code stream of the site directly as a multi-cascade channel used for transmitting the original code stream of the site.

In this embodiment, if not all requested original site code streams can be transmitted, the second MCU may transmit the part or all of the sent site code streams after adapting the site code streams. Correspondingly, before the transmission, it is determined that which site code streams need to be adapted (the second identifier set of a site), and it is determined that which site code stream (first identifier set of a site) may be transmitted after the site code streams are adapted, so that the first MCU can obtain the site code streams as many as possible. In addition, after tearing down a part of cascade channels, site code streams that need to be transmitted but need not to be adapted are determined, a corresponding multi-cascade channel is updated, and an original code stream of the site is transmitted, so that the first MCU can obtain the site code streams as clear as possible.

Figure 3:
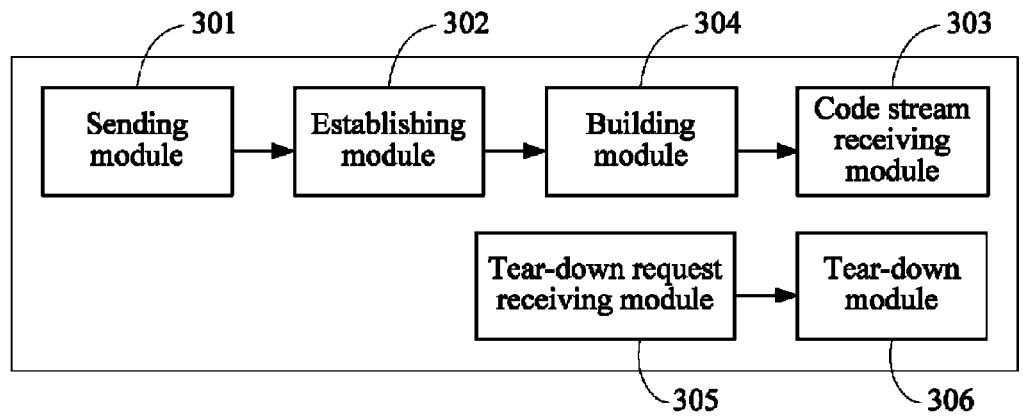
FIG. 3 is a schematic structural diagram of an apparatus for establishing a multi-cascade channel according to Embodiment 4 of the present invention.

FIG. 3 is a schematic structural diagram of an apparatus for establishing a multi-cascade channel according to Embodiment 4 of the present invention. As shown in FIG. 3, this embodiment includes the following modules: a sending module 301 configured to send a site code stream obtaining request, where the request includes at least one identifier of a site, and further configured to send an address and a port that correspond to the identifier of a site; an establishing module 302 configured to establish, according to encoding information of a code stream of a site identified by the identifier of a site, and the address and the port that correspond to the identifier of a site, a multi-cascade channel used for transmitting the code stream of the site identified by the identifier of a site with a receiver of the request; and a code stream receiving module 303 configured to receive, through the multi-cascade channel, the code stream of the site identified by the identifier of a site.

Preferably, the apparatus further includes: a building module 304 configured to build, according to encoding information of the code stream of the site identified by the identifier of a site, a decoder configured to decode the code stream of the site identified by the identifier of a site, and preferably, the encoding information specifically includes a protocol, a format and a bandwidth.

To tear down the multi-cascade channel, the apparatus further includes the following modules: a tear-down request receiving module 305 configured to receive a multi-cascade channel tear-down request, where the multi-cascade channel tear-down request includes at least one identifier of a site; and a tear-down module 306 configured to tear down a multi-cascade channel used in the site identified by the identifier of a site.

Figure 4:
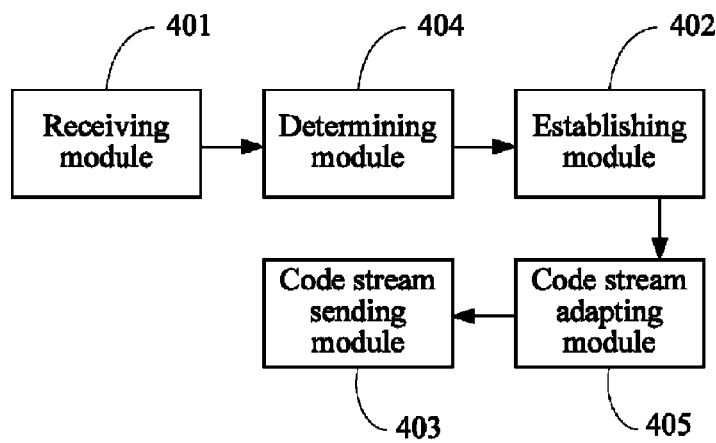
FIG. 4 is a schematic structural diagram of an apparatus for establishing a multi-cascade channel according to Embodiment 5 of the present invention.

FIG. 4 is a schematic structural diagram of an apparatus for establishing a multi-cascade channel according to Embodiment 5 of the present invention. As shown in FIG. 4, this embodiment includes the following modules: a receiving module 401 configured to receive a site code stream obtaining request, where the request includes at least one identifier of a site, and further configured to receive an address and a port that correspond to the identifier of a site; an establishing module 402 configured to establish, according to encoding information of a code stream of a site identified by the identifier of a site, and the address and the port that correspond to the identifier of a site, a multi-cascade channel used for transmitting the code stream of the site identified by the identifier of a site; and a code stream sending module 403 configured to send, through the multi-cascade channel, the code stream of the site identified by the identifier of a site.

Preferably, the apparatus further includes: a determining module 404 configured to determine that it is capable of sending, to the requester, a code stream of a site identified by each identifier of a site in a first identifier set of a site, where the first identifier set of a site is a subset of the request identifier set of a site; and the establishing module 402 is specifically configured to establish, according to encoding information of the code stream of the site identified by each identifier of a site in the first identifier set of a site and an address and a port that correspond to each identifier of a site in the first identifier set of a site, a multi-cascade channel used for transmitting the code stream of the site identified by each identifier of a site in the first identifier set of a site.

Preferably, the determining module 404 is specifically configured to determine, according to the decoding capability of the requester and the encoding information of the site identified by the identifier of a site, that it is capable of sending, to the requester, the code stream of the site identified by each identifier of a site in the first identifier set of a site.

Preferably, the determining module 404 is specifically configured to determine, after adapting a code stream of a site corresponding to each identifier of a site in a second identifier set of a site, that it is capable of sending, to the requester, the code stream of the site identified by each identifier of a site in the first identifier set of a site, where the second identifier set of a site is a subset of the first identifier set of a site.

Preferably, the apparatus further includes: a code stream adapting module 405 configured to adapt the code stream of the site identified by each identifier of a site in the second identifier set of a site.

The apparatus for establishing a multi-cascade channel according to Embodiment 4 or 5 of the present invention can be implemented through electronic hardware, or a combination of computer software and electronic hardware. If it is implemented through a combination of computer software and electronic hardware, specifically, it may be implemented by running a computer program on a computer, and running the computer program on a computer may implement the method according to Embodiments 1, 2 or 3 of the present invention. The computer includes but is not limited to a personal computer (PC) machine, a server, a personal access device (PAD) or a notebook portable computer.

The computer system includes a processor and a memory.

The memory is configured to store a computer program, and the computer program includes a computer operating instruction. The computer operating instruction includes a computer operating instruction used for implementing functions of units of an apparatus for establishing a multi-cascade channel provided by Embodiments 4 or 5 of the present invention. The memory is specifically a volatile memory.

The main processor is configured to execute a computer program stored in a memory, and is specifically configured to execute the computer operating instruction included in the computer program, so as to implement the functions of units of the apparatus for establishing a multi-cascade channel provided by Embodiments 4 or 5 of the present invention. The main processor, which is a central processing unit (CPU), is a computer core unit.

Figure 5:
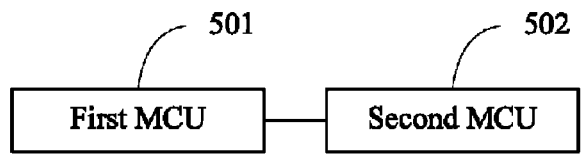
FIG. 5 is a schematic structural diagram of a system for establishing a multi-cascade channel according to Embodiment 6 of the present invention.

FIG. 5 is a schematic structural diagram of a system for establishing a multi-cascade channel according to Embodiment 6 of the present invention. As shown in FIG. 5, the system includes: a first MCU 501, which specifically is the apparatus according to Embodiment 4; and a second MCU 502, which specifically is the apparatus according to Embodiment 5.

In the method, apparatus and system for establishing a multi-cascade channel according to the embodiments of the present invention, a multi-cascade channel for a specified site is established, and a code stream of the specify site is transmitted, which solves the problem in the prior art that not all site code streams expected to be obtained can be obtained when the number of multi-cascade channels required for code streams expected to be obtained exceeds the specified number of multi-cascade channels that must be specified before a conference. In addition, through the method and apparatus for establishing a multi-cascade channel provided by the embodiments of the present invention, a specified multi-cascade channel may be torn down, which solves the problem in the prior art that multi-cascade channels that are not used occupy system resources of an MCU, such as call resources, and cannot release the resources.

A person skilled in the art may further appreciate that, in combination with the examples described in the embodiments disclosed in this specification, modules and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of a method or algorithm described in connection with the embodiments disclosed herein may be embodied directly in hardware, in a software module executed by a processor, or in a combination of the two. The software module may be located in a Random Access Memory (RAM), a computer memory, a Read Only Memory (ROM), an Electrically Programmable Read Only Memory (EPROM), an Electrically Erasable Programmable Read Only Memory (EEPROM), a register, a hard disk, a removable disk, a Compact Disk-Read Only Memory (CD-ROM), or any other storage media well-known in the art.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method for establishing a multi-cascade channel, comprising:
    receiving a site code stream obtaining request sent by a requester, wherein the request comprises at least one identifier of a site;
    receiving an address and a port that correspond to the identifier of the site;
    establishing, according to encoding information of a code stream of the site identified by the identifier of the site and the address and the port that correspond to the identifier of the site, a multi-cascade channel used for transmitting the code stream of the site identified by the identifier of the site; and
    sending, through the multi-cascade channel, the code stream of the site identified by the identifier of the site,
    wherein before establishing the multi-cascade channel, the method further comprises determining that a code stream of the site identified by each identifier of the site in a first identifier set of the site can be sent to the requester,
    wherein the first identifier set of the site is a subset of identifiers of sites in the site code stream obtaining request,
    wherein establishing the multi-cascade channel comprises establishing, according to encoding information of the code stream of the site identified by each identifier of the site in the first identifier set of the site, and the address and the port that correspond to the first identifier set of the site, the multi-cascade channel used for transmitting the code stream of the site identified by each identifier of the site in the first identifier set of the site, and
    wherein sending the code stream comprises sending, through the multi-cascade channel, the code stream of the site identified by each identifier of the site in the first identifier set of the site.

2. The method according to claim 1, wherein before determining that it is the code stream can be sent to the requester, the method further comprises receiving decoding capability information of the requester, and wherein determining that the code stream can be sent to the requester comprises determining the code stream of the site identified by each identifier of the site in the first identifier set of the site according to the decoding capability information of the requester and the encoding information of the code stream of the site identified by the identifier of the site in the site code stream obtaining request can be sent to the requester.

3. The method according to claim 1, wherein the site code stream obtaining request further comprises priority information of the site identified by the identifier of the site, wherein determining that the code stream can be sent to the requester comprises determining that the code stream of the site identified by each identifier of the site in the first identifier set of the site according to the decoding capability information of the requester and the encoding information of the code stream of the site identified by the identifier of the site in the site code stream obtaining request and the priority information of the site can be sent to the requester.

4. The method according to claim 1, wherein determining that the code stream can be sent to the requester comprises determining, after adapting the code stream of the site identified by each identifier of the site in a second identifier set of the site, that the code stream of the site identified by each identifier of the site in the first identifier set of the site can be sent to the requester, wherein the second identifier set of the site is a subset of the first identifier set of the site, wherein establishing the multi-cascade channel comprises establishing, according to the encoding information of the code stream of the site identified by each identifier of the site in the second identifier set of the site and the address and the port that correspond to the site identified by each identifier of the site in the second identifier set of the site, the multi-cascade channel used for transmitting an adaptive code stream of the site identified by each identifier of the site in the second identifier set of the site, and wherein sending the code stream comprises:
    adapting the code stream of the site identified by each identifier of the site in the second identifier set of the site; and
    sending, through the multi-cascade channel used for transmitting the adaptive code stream of the site identified by each identifier of the site in the second identifier set of the site, the adaptive code stream of the site identified by each identifier of the site in the second identifier set of the site.

5. An apparatus for establishing a multi-cascade channel, comprising:
    a receiving module configured to:
        receive a site code stream obtaining request sent by a requester, wherein the request comprises at least one identifier of a site; and
        receive an address and a port that correspond to the identifier of the site;
    an establishing module configured to establish, according to encoding information of a code stream of the site identified by the identifier of the site and the address and the port that correspond to the identifier of the site, a multi-cascade channel used for transmitting the code stream of the site identified by the identifier of the site; and
    a code stream sending module configured to send, through the multi-cascade channel the code stream of the site identified by the identifier of the site,
    wherein the apparatus further comprises a determining module configured to determine that a code stream of the site identified by each identifier of the site in a first identifier set of the site can be sent to the requester,
    wherein the first identifier set of the site is a subset of identifiers of sites in the site code stream obtaining request,
    wherein the establishing module is configured to establish, according to the encoding information of the code stream of the site identified by each identifier of the site in the first identifier set of the site and the address and the port that correspond to the first identifier set of the site, a multi-cascade channel used for transmitting the code stream of the site identified by each identifier of the site in the first identifier set of the site, and wherein the code stream sending module is configured to send, through the multi-cascade channel, the code stream of the site identified by each identifier of the site in the first identifier set of the site.

6. The apparatus according to claim 5, wherein the receiving module is further configured to receive decoding capability information of the requester, and wherein the determining module is configured to determine, according to the decoding capability information of the requester and the encoding information of the site identified by the identifier of the site in the site code stream obtaining request, that the code stream of the site identified by each identifier of the site in the first identifier set of the site can be sent to the requester.

7. The apparatus according to claim 5, wherein the determining module is configured to determine, after adapting the code stream of the site identified by each identifier of the site in a second identifier set of the site, that the code stream of the site identified by each identifier of the site in the first identifier set of the site can be sent to the requester, wherein the second identifier set of the site is a subset of the first identifier set of the site, and wherein the apparatus further comprises a code stream adapting module configured to adapt the code stream of the site identified by each identifier of the site in the second identifier set of the site.

8. A system for establishing a multi-cascade channel, wherein the system comprises:
   a first Multipoint Control Unit (MCU) comprising:
     a sending module configured to:
       send a site code stream obtaining request, wherein the request comprises at least one identifier of a site; and
       send an address and a port that correspond to the identifier of the site;
     an establishing module configured to establish, with a receiver of the site code stream obtaining request, a multi-cascade channel used in the site identified by the identifier of the site according to encoding information of a code stream of the site identified by the identifier of the site and the address and the port that correspond to the identifier of the site; and
     a code stream receiving module configured to receive, through the multi-cascade channel, the code stream of the site identified by the identifier of the site; and
   a second MCU comprising:
     a receiving module configured to:
       receive the site code stream obtaining request sent by a requester, wherein the request comprises at least one identifier of the site; and
       receive an address and a port that correspond to the identifier of the site;
     an establishing module configured to establish, according to encoding information of the code stream of the site identified by the identifier of the site, and the address and the port that correspond to the identifier of the site, a multi-cascade channel used for transmitting the code stream of the site identified by the identifier of the site; and a code stream sending module configured to send, through the multi-cascade channel the code stream of the site identified by the identifier of the site,
   wherein the second MCU further comprises a determining module configured to determine that a code stream of the site identified by each identifier of the site in a first identifier set of the site can be sent to the requester,
   wherein the first identifier set of the site is a subset of identifiers of sites, in the site code stream obtaining request,
   wherein the establishing module is configured to establish, according to the encoding information of the code stream of the site identified by each identifier of the site in the first identifier set of the site and the address and the port that correspond to the first identifier set of the site, the multi-cascade channel used for transmitting the code stream of the site identified by each identifier of the site in the first identifier set of the site, and
   wherein the code stream sending module is configured to send, through the multi-cascade channel, the code stream of the site identified by each identifier of the site in the first identifier set of the site.

9. The system according to claim 8, wherein the receiving module is further configured to receive decoding capability information of the requester, and wherein the determining module is configured to determine, according to the decoding capability information of the requester and the encoding information of the site identified by the identifier of the site in the site code stream obtaining request, that the code stream of the site identified by each identifier of the site in the first identifier set of the site can be sent to the requester.

10. The system according to claim 8, wherein the determining module is configured to determine, after adapting a code stream of the site identified by each identifier of the site in a second identifier set of the site, that the code stream of the site identified by each identifier of the site in the first identifier set of the site can be sent to the requester, wherein the second identifier set of the site is a subset of the first identifier set of the site, and wherein the apparatus further comprises a code stream adapting module configured to adapt the code stream of the site identified by each identifier of the site in the second identifier set of the site.

* * * * *